United States Patent
Tsuchiya

(10) Patent No.: US 12,306,403 B2
(45) Date of Patent: May 20, 2025

(54) ELECTRONIC DEVICE AND METHOD FOR CONTROLLING ELECTRONIC DEVICE

(71) Applicant: CANON KABUSHIKI KAISHA, Tokyo (JP)

(72) Inventor: Takumi Tsuchiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 17/838,340

(22) Filed: Jun. 13, 2022

(65) Prior Publication Data
US 2022/0413295 A1 Dec. 29, 2022

(30) Foreign Application Priority Data
Jun. 23, 2021 (JP) .................. 2021-103950

(51) Int. Cl.
*G02B 27/01* (2006.01)
*H04N 23/617* (2023.01)
*H04N 23/69* (2023.01)

(52) U.S. Cl.
CPC ....... *G02B 27/0172* (2013.01); *H04N 23/617* (2023.01); *H04N 23/69* (2023.01); *G02B 2027/0138* (2013.01); *G02B 2027/0178* (2013.01)

(58) Field of Classification Search
CPC ...... H04N 23/617; H04N 23/69; H04N 23/60; G02B 27/0172; G02B 2027/0138; G02B 2027/0178
See application file for complete search history.

(56) References Cited

U.S. PATENT DOCUMENTS

| | | | |
|---|---|---|---|
| 10,447,966 B2 * | 10/2019 | Ritchey | G02B 27/0176 |
| 10,896,545 B1 * | 1/2021 | Kin | G02B 27/0172 |
| 2014/0072274 A1 | 3/2014 | Nitta et al. | |
| 2014/0210955 A1 * | 7/2014 | Fujita | H04N 13/221 |
| | | | 348/50 |

(Continued)

FOREIGN PATENT DOCUMENTS

| | | |
|---|---|---|
| JP | 2011-193286 A | 9/2011 |
| JP | 2013165366 A | 8/2013 |

(Continued)

OTHER PUBLICATIONS

The above foreign patent documents were cited in the Apr. 15, 2025 Japanese Office Action, which is enclosed without an English Translation, that issued in Japanese Patent Application No. 2021-103950.

*Primary Examiner* — Twyler L Haskins
*Assistant Examiner* — John H Morehead, III
(74) *Attorney, Agent, or Firm* — Cowan, Liebowitz & Latman, P.C.

(57) ABSTRACT

An electronic device, for supporting image capturing by an imaging apparatus, includes at least one processor and/or at least one circuit which function as: a generating unit configured to generate a first object in a virtual space corresponding to a current image capturing range of the imaging apparatus, and a second object in a virtual space corresponding to an image capturing range in a case where the imaging apparatus has a predetermined position and a predetermined orientation; and a display control unit configured to display the first object and the second object.

19 Claims, 12 Drawing Sheets

(56) References Cited

U.S. PATENT DOCUMENTS

| | | | |
|---|---|---|---|
| 2018/0352144 A1* | 12/2018 | Miao | G06T 7/73 |
| 2019/0005728 A1* | 1/2019 | Leppanen | G06T 19/20 |
| 2019/0362556 A1* | 11/2019 | Ben-Dor | G06F 3/167 |
| 2020/0307616 A1* | 10/2020 | Nithiyanantham | G02B 27/0093 |
| 2021/0058609 A1 | 2/2021 | Takahashi et al. | |
| 2021/0116249 A1* | 4/2021 | Pecota | G09G 5/377 |
| 2021/0142565 A1* | 5/2021 | Lekse | G06F 3/01 |
| 2021/0173480 A1* | 6/2021 | Osterhout | G06F 3/04815 |
| 2021/0365707 A1* | 11/2021 | Mao | G06V 10/25 |
| 2021/0375048 A1* | 12/2021 | Kang | G06T 7/73 |
| 2021/0390780 A1* | 12/2021 | Canberk | G06F 3/167 |
| 2021/0405363 A1* | 12/2021 | Canberk | G02B 27/0101 |
| 2021/0409628 A1* | 12/2021 | Kalkgruber | G06F 3/012 |

FOREIGN PATENT DOCUMENTS

| | | | |
|---|---|---|---|
| JP | 2017069911 A | 4/2017 | |
| JP | 2020-167499 A | 10/2020 | |
| WO | 2019013204 A | 1/2019 | |

\* cited by examiner

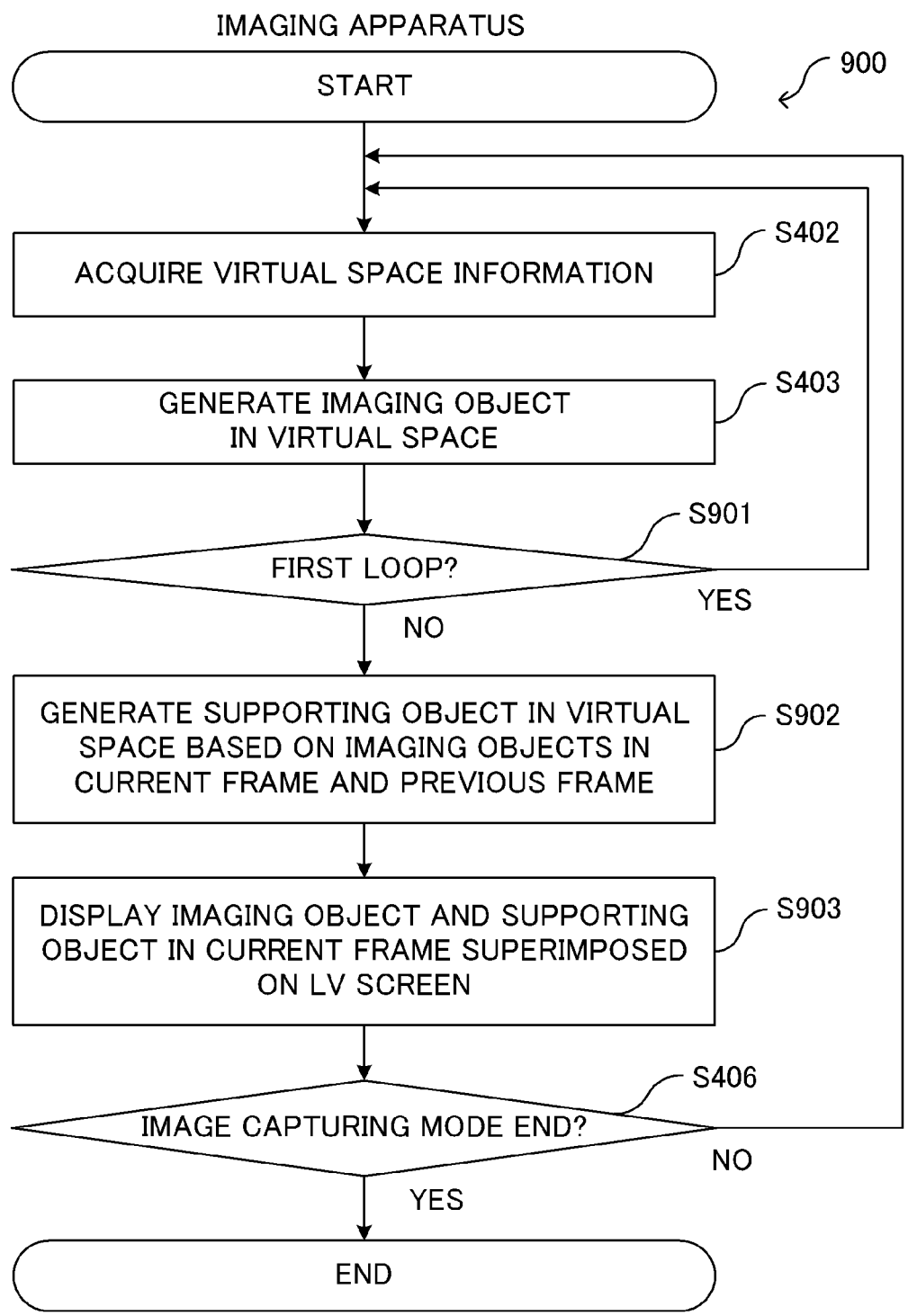

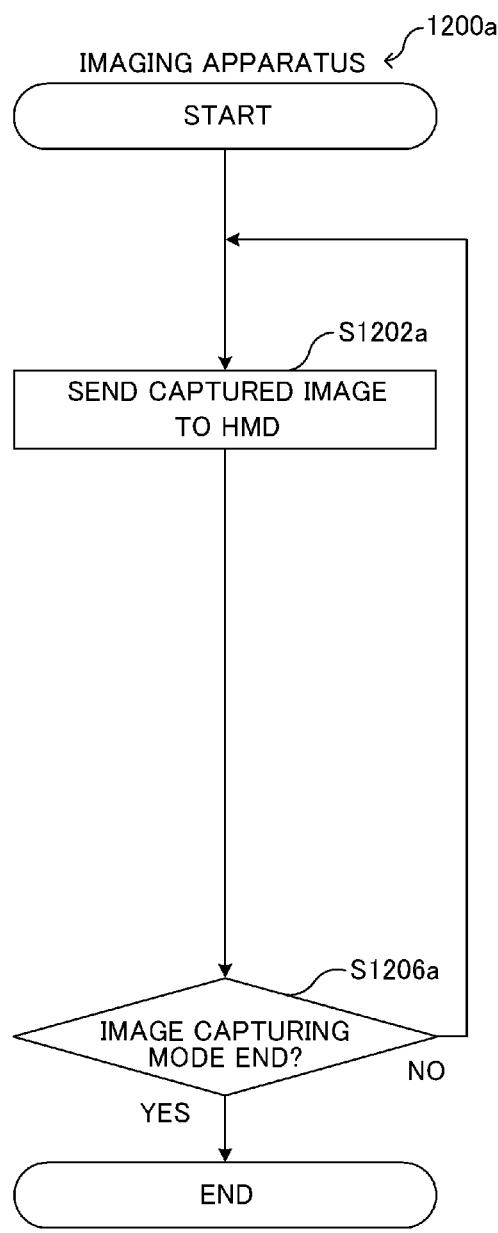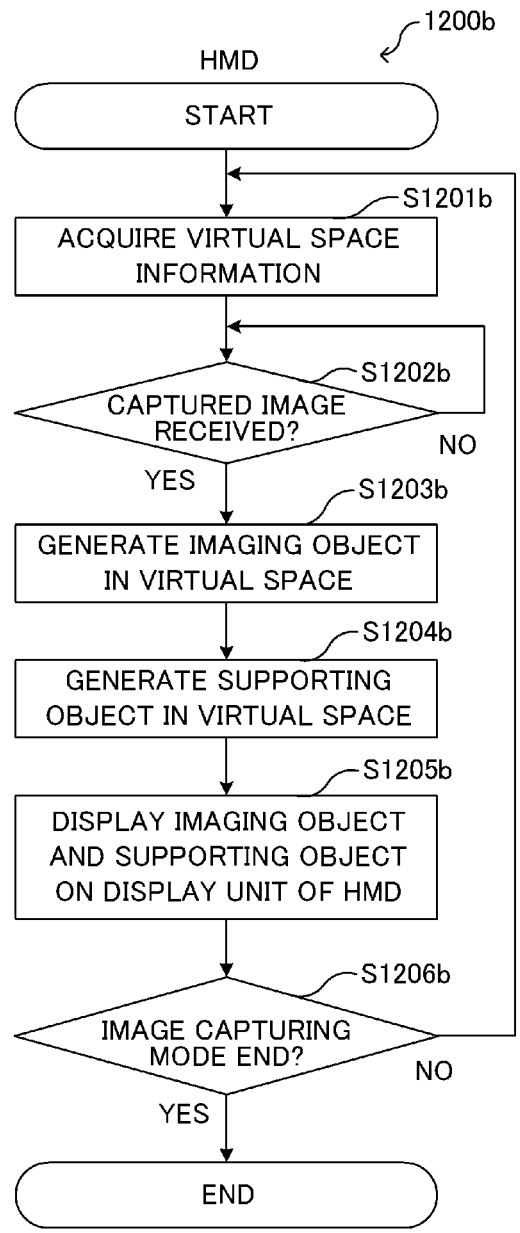

ELECTRONIC DEVICE AND METHOD FOR CONTROLLING ELECTRONIC DEVICE

BACKGROUND OF THE INVENTION

Field of the Invention

The present invention relates to an electronic device and a method for controlling the electronic device.

Description of the Related Art

In a camera or a camera installed in a smartphone, functions to support image capturing have been included. The functions to support image capturing include, for example, a function to display grid or horizontal lines on a live view (LV) screen, a peeking function to show a user a location where a subject displayed on the LV screen is focused, and a function to indicate a destination to which the camera moves in panoramic image capturing.

Also in recent years, techniques such as augmented reality (AR) and mixed reality (MR) are used in a head mount display (HMD), a camera equipped smartphone, a tablet terminal, and the like.

For example, as a technique to support determining an angle of view, Japanese Patent Application Publication No. 2020-167499 discloses an apparatus that supports fixed-point image capturing. Specifically, the apparatus according to Japanese Patent Application Publication No. 2020-167499 generates AR objects of a position of a camera and an image capturing range at the time when a photograph was taken in the past, and superimposes and displays the generated AR objects on an LV screen of the camera of the real object. By moving the camera of the real object and overlaying the same on the camera of the AR object displayed on the LV screen, and also by matching the image capturing range with the image capturing range of the AR object, the user can capture an image at the same angle of view of a photograph taken in the past.

Japanese Patent Application Publication No. 2011-193286 discloses an apparatus that supports panoramic image capturing. Specifically, the apparatus according to Japanese Patent Application Publication No. 2011-193286 displays, on the LV screen, a two-dimensional object, to guide an optimum moving speed of the apparatus for panoramic image capturing.

However, even if the camera of an AR object is displayed on the LV screen of the camera of the real object, in some cases it may be difficult to overlay the camera of the real object accurately on the camera of the AR object. Furthermore, if the shape of the camera of the AR object is different from the shape of the camera used for image capturing, it is difficult to accurately match the position and orientation of the camera of the real object with the camera of the AR object.

Furthermore, in the case where a two-dimensional object for guiding the moving speed is displayed on the LV screen, movement of a camera on the two-dimensional plane that is parallel with the imaging plane can be supported, but supporting the image capturing in a three-dimensional space is difficult.

SUMMARY OF THE INVENTION

The present invention provides an electronic device that makes determination of an appropriate angle of view easier, and supports image capturing in the three-dimensional space.

The electronic device of the present invention is an electronic apparatus for supporting image capturing in an imaging apparatus, the electronic device including at least one processor and/or at least one circuit which function as: a generating unit configured to generate a first object in a virtual space corresponding to a current image capturing range of the imaging apparatus, and a second object in a virtual space corresponding to an image capturing range in a case where the imaging apparatus has a predetermined position and a predetermined orientation; and a display control unit configured to display the first object and the second object.

Further features of the present invention will become apparent from the following description of exemplary embodiments with reference to the attached drawings.

BRIEF DESCRIPTION OF THE DRAWINGS

FIG. 9 is a flow chart exemplifying image capturing support processing of Embodiment 2;

FIGS. 12A and 12B are flow charts exemplifying image capturing support processing of Embodiment 3.

DESCRIPTION OF THE EMBODIMENTS

Configurations of an imaging apparatus and an HMD will be described as embodiments of an electronic device according to the present invention, with reference to FIGS. 1A, 1B and FIG. 2. The configurations described in FIGS. 1A, 1B and FIG. 2 are the same for all the embodiments described herein below.

Figure 1A:
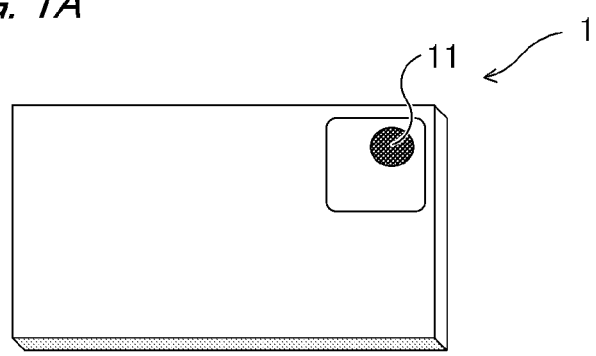
FIGS. 1A and 1B are diagrams exemplifying an external view of an imaging apparatus.
Figure 1B:
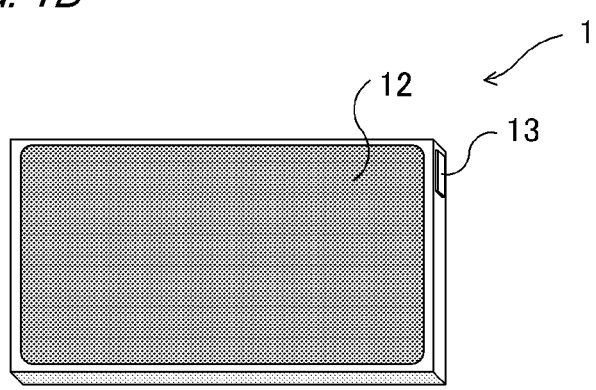

FIGS. 1A and 1B are diagrams exemplifying an external view of an imaging apparatus. The imaging apparatus 1 may be integrated into the electronic device, or may be separate from the electronic device. FIGS. 1A and 1B indicate a front face and a rear face of the imaging apparatus 1 respectively. The imaging apparatus 1 is an apparatus having an image pickup element, such as a camera, a smartphone and a tablet terminal. The imaging apparatus 1 includes an imaging unit 11, a display unit 12 and an operation unit 13.

At least one imaging unit 11 is mounted on at least one of the front face and the rear face of the imaging apparatus 1. The display unit 12 is a display having a touch panel, and displays various images. The touch panel of the display unit 12 accepts operations performed by using a finger of the user, a stylus pen, or the like. The operation unit 13 is a member to input operations that the user performs via a button, dial, and the like. One or more operation units 13 may be disposed on the imaging apparatus 1, or the operation unit 13 may be implemented by a touch panel of the display unit 12. The display unit 12 is an example of the "display control unit".

Figure 2:
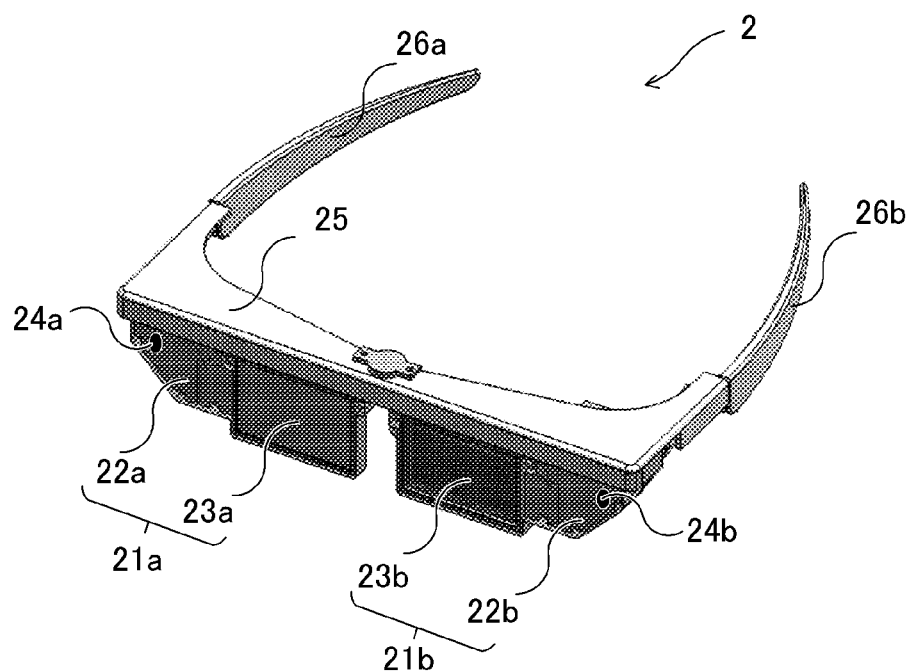
FIG. 2 is a diagram exemplifying an external view of an HMD.

FIG. 2 is a diagram exemplifying an external view of an HMD2. The HMD2 exemplified in FIG. 2 is an optical see-through type HMD. The HMD2 is a head mounted type display device, and is also called AR glasses. The HMD2 includes a frame and two display units (display unit 21a and display unit 21b). The frame includes a rim 25 and temples 26a and 26b which are bonded to each side of the rim 25. The display units 21a and 21b are bonded to one side of the rim 25.

The light from a display element (not illustrated) of the display unit 21a is guided to the right eye of a user wearing the HMD2 via an image-projecting unit 22a and a light-guiding unit 23a. In the same manner, the light from a display element (not illustrated) of the display unit 21b is guided to the left eye of the user wearing the HMD2 via an image-projecting unit 22b and a light-guiding unit 23b.

The user can recognize the images displayed on the display unit 21a and the display unit 21b and the incident light coming from the front side of the HMD2 simultaneously. The HMD2 may have two imaging units (imaging unit 24a and imaging unit 24b). The imaging unit 24a and the imaging unit 24b capture images of the surroundings, including the front area of the HMD. In this description, the HMD2 is assumed to be an optical see-through type HMD using a transparent display, but may be a video see-through type HMD using an opaque display.

The imaging apparatus 1 or the HMD2 according to each embodiment described below recognizes the surrounding space using an equipped imaging unit or the like, whereby various virtual objects matching with the surrounding space can be presented to the user as three-dimensional information. By presenting the information using a virtual space or virtual objects, information in the depth direction, which has been difficult for the user to recognize, can be provided to the user. The virtual objects mapped in a real space can be used for various imaging capturing support units.

Embodiment 1 and Embodiment 2 are embodiments to support image capturing by the imaging apparatus 1 or the HMD2 when an image is captured using one of the imaging apparatus 1 and the HMD2. Embodiment 3, on the other hand, is an embodiment to support image capturing by the imaging apparatus 1 in the case where the imaging apparatus 1 and the HMD2 are operated in tandem.

Embodiment 1

Embodiment 1 is an embodiment to support the movement of the imaging apparatus 1 or the HMD2 by displaying a moving destination, in order to capture an image at an optimum angle of view using either one of the imaging apparatus 1 and the HMD2. In the following description, a case of supporting image capturing performed by the imaging apparatus 1 will be described.

Figure 3:
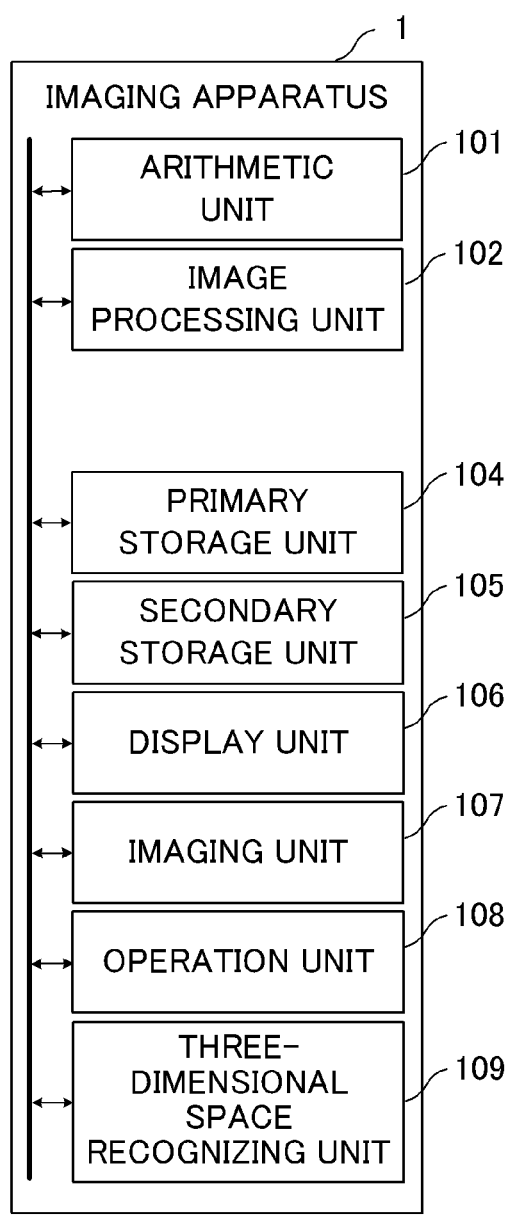
FIG. 3 is a diagram depicting a hardware configuration example of the imaging apparatus of Embodiment 1.

FIG. 3 is a diagram depicting a hardware configuration example of the imaging apparatus 1 according to Embodiment 1. The imaging apparatus 1 includes an arithmetic unit 101, an image processing unit 102, a primary storage unit 104, a secondary storage unit 105, a display unit 106, an imaging unit 107, an operation unit 108 and a three-dimensional space recognizing unit 109. Each composing element of the imaging apparatus 1 is interconnected via a bus.

the arithmetic unit 101 is a central processing unit (CPU), for example, and controls the imaging apparatus 1 in general. The arithmetic unit 101 may include a hardware circuit that implements functions executed by the imaging apparatus 1. The image processing unit 102 generates an object (imaging object) that indicates an imaging angle of view in a virtual space recognized by the three-dimensional space recognizing unit 109, and a supporting object that supports image capturing with the imaging apparatus 1 by the user.

The imaging object is an AR object in a virtual space, which corresponds to a current image capturing range of the imaging apparatus. The supporting object is an AR object in a virtual space, which corresponds to an image capturing range in a case where the imaging apparatus 1 has a predetermined position and a predetermined orientation. The supporting object is an AR object to present an ideal moving destination of an imaging object, in order to move the imaging apparatus 1 with ideal camera work. The imaging object corresponds to the "first object". The supporting object corresponds to the "second object".

The image processing unit 102 generates a supporting object such that the movement of the imaging apparatus 1 is controlled by the user overlaying the imaging object with a supporting object. By moving the imaging apparatus 1 so that the imaging object is overlaid on the supporting object, the user can capture an image at a constant speed, or capture an image according to a regular path. The image processing unit 102 is an example of the "generating unit".

The primary storage unit 104 is a dynamic random access memory (DRAM), for example, and temporarily stores image data. The secondary storage unit 105 is a flash memory, for example, and records captured images and the like.

The display unit 106 is a display to display captured images and other visual objects. The display unit 106 displays an imaging object and a supporting object superimposed on an image capturing a real space. The imaging unit 107 converts light into electric signals. The operation unit 108 accepts operation from the user. The display unit 106, the imaging unit 107 and the operation unit 108 correspond to the display unit 12, the imaging unit 11 and the operation unit 13 indicated in FIG. 1B respectively.

The three-dimensional space recognizing unit 109 detects a position of an object in and a distance to the object in a real space, and acquires information on a virtual space. The three-dimensional space recognizing unit 109 can recognize the real three-dimensional space using a plurality of cameras, for example. The three-dimensional space recognizing unit 109 is an example of the "acquiring unit". The processing performed by the three-dimensional space recognizing unit 109 may be executed by the imaging unit 107.

Figure 4:
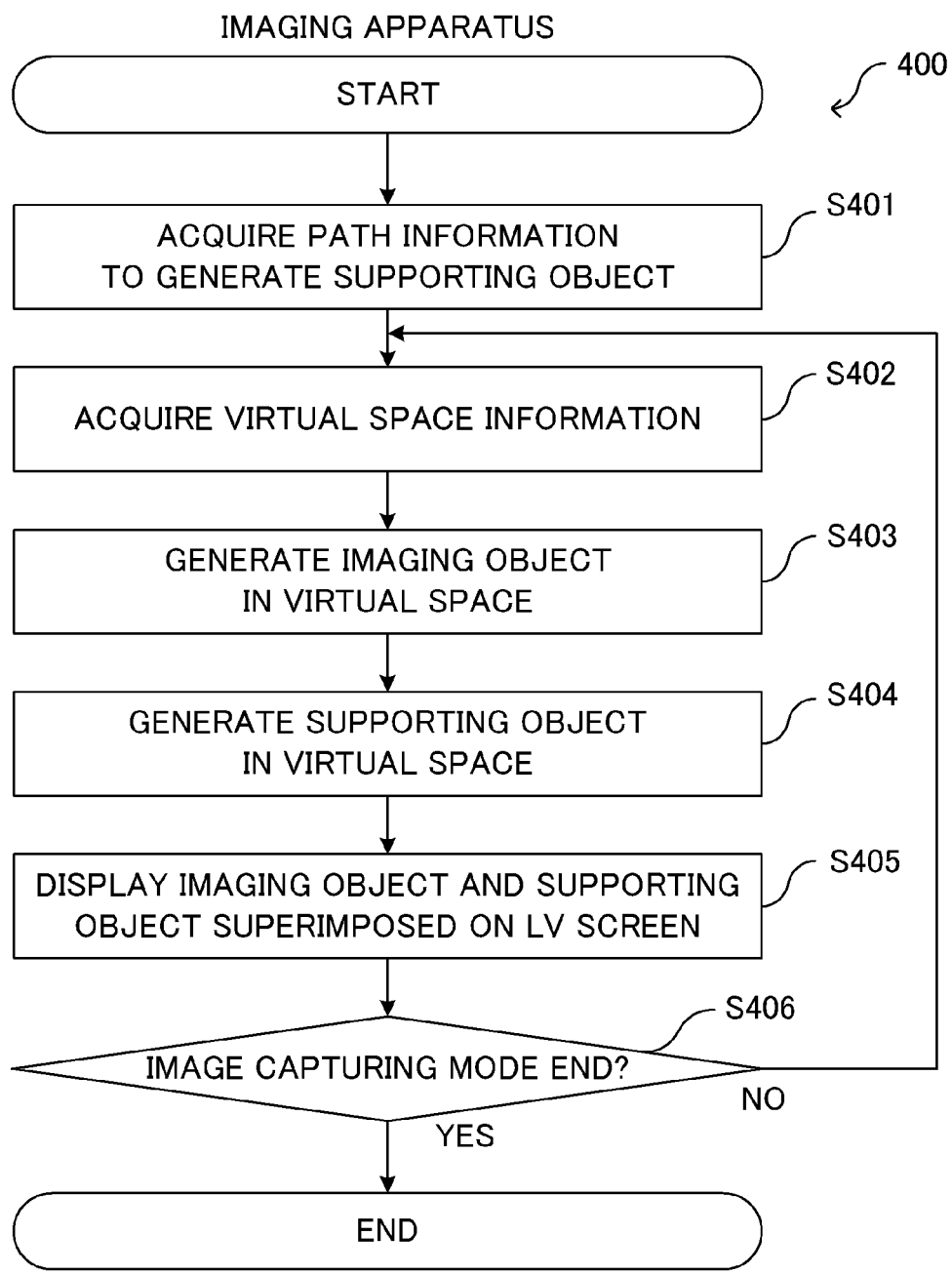
FIG. 4 is a flow chart exemplifying image capturing support processing of Embodiment 1.

FIG. 4 is a flow chart exemplifying image capturing support processing 400 according to Embodiment 1. The image capturing support processing 400 is processing to support image capturing by the user, by generating and displaying an imaging object and a supporting object on the LV screen. The imaging object and the supporting object are displayed superimposed on the image capturing the real space. In Embodiment 1, the supporting object is generated based on path information which indicates the future movement of the imaging apparatus 1, such as the moving speed and path thereof.

The image capturing support processing 400 is started when the imaging apparatus 1 enters an image capturing mode by the user operating the operation unit 108 of the imaging apparatus 1, for example. The arithmetic unit 101 of the imaging apparatus 1 executes programs for each composing element to perform each processing step of the image capturing support processing 400.

In S401, the image processing unit 102 acquires the path information which is used for generating the supporting object. The path information is information to indicate future movement of the image capturing range (camera work) of the captured image. The path information includes information to determine the position, orientation (direction component from the position of the supporting object), moving speed and path of the supporting object in the virtual space.

The supporting object is an AR object in a virtual space, which corresponds to an image capturing range in a case where the imaging apparatus is at a predetermined position and is in a predetermined orientation. Based on the acquired path information, the image processing unit 102 can determine the predetermined position and predetermined orientation. The image processing unit 102 may acquire the path information stored in the secondary storage unit 105 in advance, or may acquire the path information inputted by the user via the operation unit 108.

The path information will now be described with reference to FIGS. 5A to 5C, FIG. 6A and FIG. 6B. The path information is information to indicate movement of the imaging apparatus 1, and is information indicating, for example, movement when the imaging apparatus 1 moves straight ahead at a constant speed, or movement when the imaging apparatus 1 rotates in the horizontal direction around the imaging apparatus 1 or the user. The path information may be information indicating movement when the imaging apparatus 1 rotates at a constant speed around the optical axis of light entering the imaging unit 107 (imaging axis of imaging apparatus 1), or movement when the imaging apparatus 1 rotates around a subject.

Figure 5A:
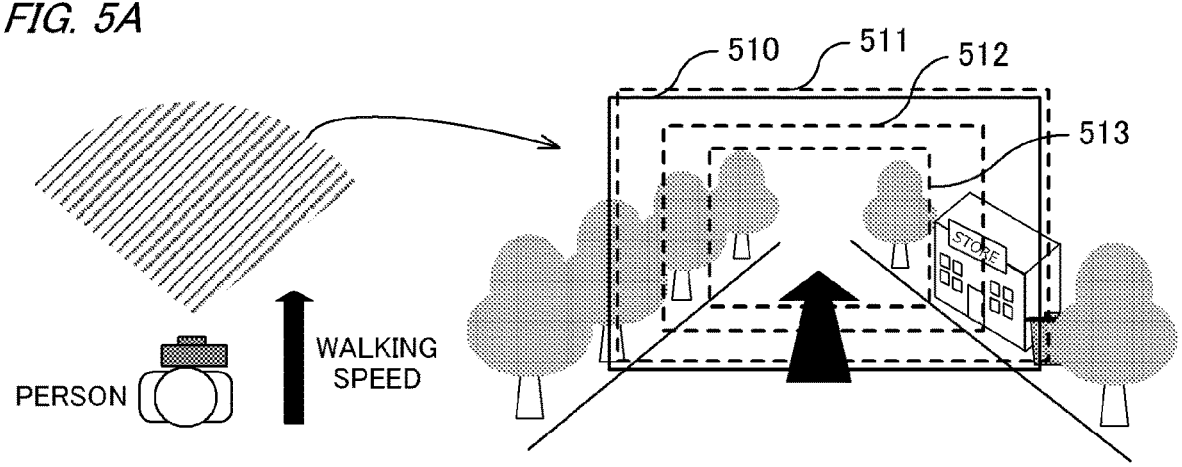
FIGS. 5A to 5C are diagrams for describing path information.

FIG. 5A is an example when a person (user capturing the image) is moving straight ahead at a constant speed. When the user overlays an imaging object 510 on a supporting object 511, the display unit 106 displays a supporting object 512 ahead of the supporting object 511. Then when the user overlays the imaging object 510 on the supporting object 512, the display unit 106 displays a supporting object 513 ahead of the supporting object 512.

Figure 5B:
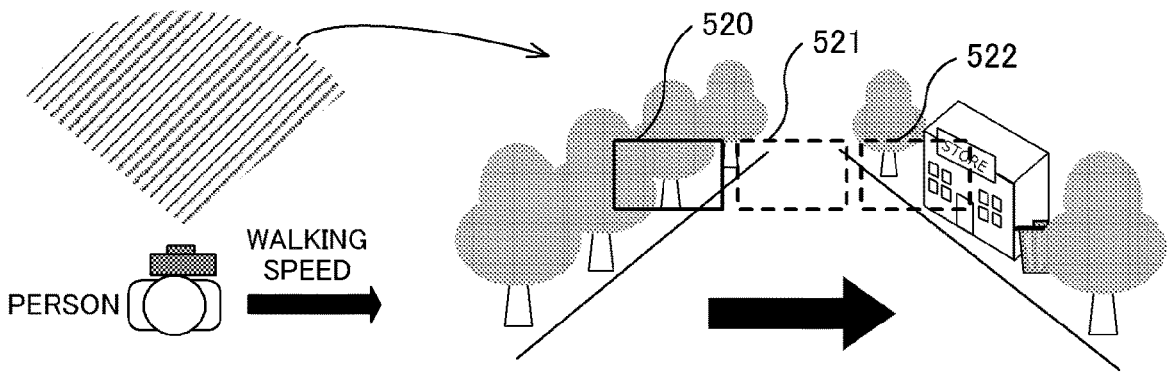

FIG. 5B is an example when a person moves in the lateral direction at a constant speed. When the user overlays an imaging object 520 on the supporting object 521, the display unit 106 displays a supporting object 522 in the lateral direction of the supporting object 521.

Figure 5C:
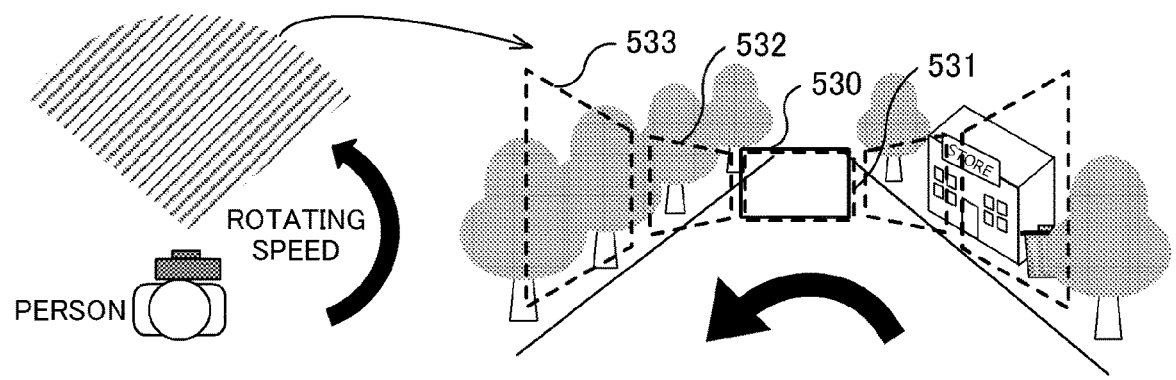

FIG. 5C is an example when the imaging apparatus 1 is rotated in the horizontal direction at a constant speed around the imaging apparatus 1. When the user overlays an imaging object 530 on a supporting object 531, the display unit 106 displays a supporting object 532 in a direction where the imaging apparatus 1 rotates. Then when the user overlays the imaging object 530 on the supporting object 532, the display unit 106 displays a supporting object 533 in a direction where the imaging apparatus 1 rotates.

Figure 6A:
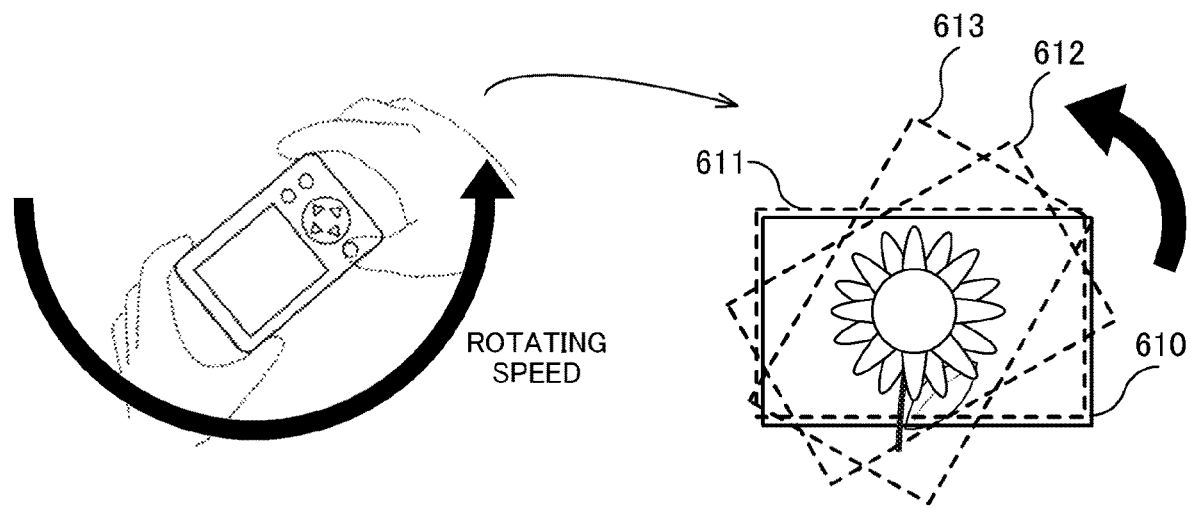
FIGS. 6A and 6B are diagrams for describing path information.

FIG. 6A is an example when the imaging apparatus 1 is rotated at a constant speed around the image capturing axis of the imaging apparatus 1. When the user overlays an imaging object 610 on a supporting object 611, the display unit 106 displays a supporting object 612 in a direction where the imaging apparatus 1 rotates around the image capturing axis. Then when the user overlays the imaging object 610 on the supporting object 612, the display unit 106 displays a supporting object 613 in a direction where the imaging apparatus 1 is in a direction where the imaging apparatus 1 rotates around the image capturing axis.

Figure 6B:
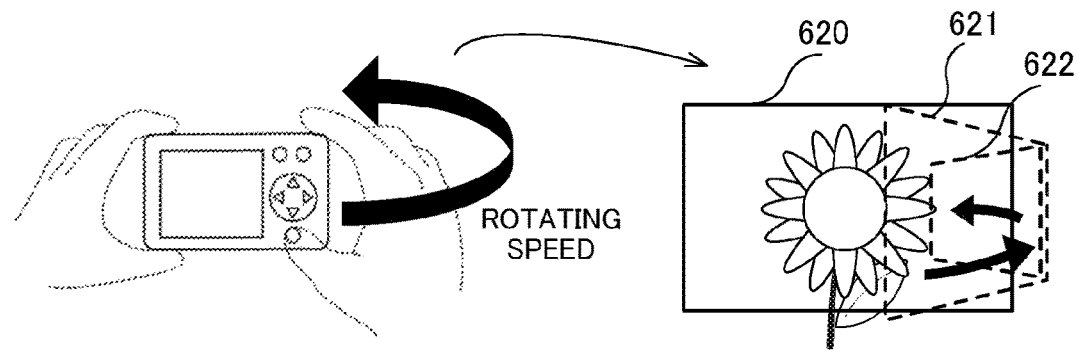

FIG. 6B is an example when the imaging apparatus 1 is rotated at a constant speed around a subject. When the user overlays an imaging object 620 on a supporting object 621, the display unit 106 displays a supporting object 622 in a direction where the imaging apparatus 1 rotates around the subject.

The supporting objects may be displayed one at a time in accordance with the movement of the imaging apparatus 1 based on the path information. Further, a plurality of supporting objects may be displayed such that the predetermined position and the predetermined orientation are a position and an orientation of the imaging apparatus 1 at each of the plurality of future timings based on the path information. The supporting object displayed in the past may not be displayed in the case where the difference in position or orientation from that of the imaging object is a threshold or more, or may be continuously displayed.

The path information is not limited to the speed or path of the imaging apparatus 1, but may be information to indicate a movement to position the subject at a predetermined position (e.g. center or edge of image capturing range), or may be a movement to place the front face of the subject within the image capturing range.

In S402 in FIG. 4, the three-dimensional space recognizing unit 109 acquires the position of the object in the real space and the distance from the imaging apparatus 1 to the object as virtual space information, and stores the information in the primary storage unit 104.

In S403, the image processing unit 102 generates an imaging object, which indicates an image capturing range where the imaging unit 107 is captured an image, in the virtual space recognized by the three-dimensional space recognizing unit 109. The image processing unit 102 adds information on the generated imaging object to the virtual space information that is held in the primary storage unit 104. The imaging object is an AR object which indicates a position and the orientation corresponding to the image capturing range of the imaging apparatus 1.

In the virtual space information that is held in the primary storage unit 104, the image processing unit 102 searches a portion matching with the image being captured by the imaging apparatus 1, using template matching, for example. The image processing unit 102 can generate the imaging object based on the position and orientation of the searched portion matching with the image capturing in the virtual space.

The shape of the imaging object may be a shape that can uniquely determine a position and orientation, such as a frame, rectangular parallelepiped, cursor, or points indicating four corners of the image capturing range. The position of the imaging object in the depth direction may be a position at a focal distance which is the best focused, for example.

The position of the imaging object in the depth direction may be a position that is distant from the imaging apparatus 1 by a predetermined distance, and the size of the imaging object may be set to be variable. For example, in the case where the shape of the imaging object is a frame, the distance from the imaging apparatus 1 to the frame may be fixed to 1 m, which is predetermined, and the size of the frame may be set to be variable. The distance from the imaging apparatus 1 to the frame may be a distance from the imaging apparatus 1 to the center of the frame, for example.

The position of the imaging object in the depth direction may be set such that the size of the imaging object has a predetermined size, and the distance from the imaging apparatus 1 to the imaging object is set to be variable. For example, in a case where the shape of the imaging object is a frame, the size of the frame may be fixed to a predetermined size, such as 30 cm of the diagonal line of the frame in the real space, and the distance from the imaging apparatus 1 to the frame may be set to be variable.

In the case of a small space where an obstacle exists in front of the imaging apparatus 1, for example, the image processing unit 102 may generate the imaging object such that the imaging object is displayed at a position closer to the imaging apparatus 1 than the obstacle. The image processing unit 102 can change the display position of the imaging object in accordance with the surrounding space.

In the case of the above mentioned example, the position and orientation of the imaging object are acquired based on the image capturing range where the imaging unit 107 is capturing an image. The position and orientation of the imaging object may also be acquired from the position and orientation of the imaging apparatus 1 in the real space.

In S404, the image processing unit 102 generates a supporting object, which is an AR object to support image capturing. The image processing unit 102 generates the supporting object based on the path information acquired in S401.

The path information is information to indicate the movement of the image capturing range of the capturing image (camera work). For example, in a case where the path information is information to indicate the movement when the imaging apparatus 1 moves straight ahead at a constant speed, the image processing unit 102 generates the supporting object so that the current imaging object can be displayed at a position where the imaging apparatus 1 is moved straight ahead according to the orientation of this imaging object. Specifically, the image processing unit 102 may generate the supporting object such that the orientation of the imaging apparatus 1 is the predetermined orientation, and the position, where the imaging apparatus 1 is moved straight ahead in the predetermined orientation for one second at a constant speed, is the predetermined position.

The image processing unit 102 can generate the supporting object at a position to which the current imaging object is moved in accordance with the movement indicated in the path information. The image processing unit 102 may generate the supporting object such that the relative relationship between the predetermined position of the imaging apparatus 1 and the position of the supporting object becomes the same as the relative relationship between the current position of the imaging apparatus 1 and the position of the imaging object. The image processing unit 102 adds the information on the generated supporting object to the virtual space information that is held in the primary storage unit 104.

Figure 7:
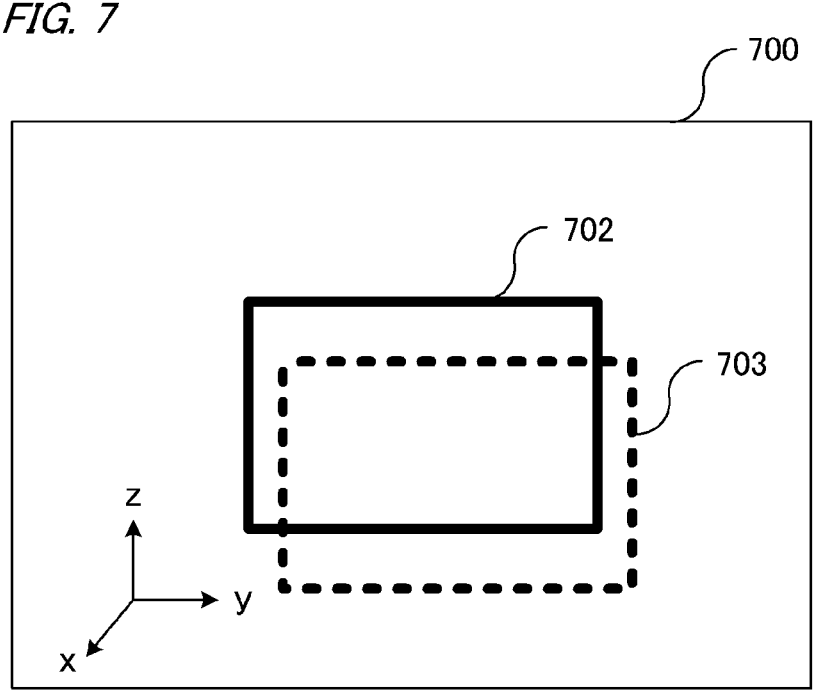
FIG. 7 is an example of generating an imaging object and a supporting object according to Embodiment 1.

FIG. 7 is an example of generating an imaging object and a supporting object. FIG. 7 is a schematic diagram depicting a state where information on an imaging object 702 and information on a supporting object 703 are added to the information on a virtual space 700.

In S405 of FIG. 4, the display unit 106 superimposes the imaging object and the supporting object that are held in the primary storage unit 104 on the image capturing the real space, and displays the generated image on the LV screen. The superimposing processing may be performed by the image processing unit 102.

In the superimposing processing, the display unit 106 first acquires information on a portion of the virtual space 700 corresponding to the image generated by the imaging unit 107 capturing the real space. Then the display unit 106 superimposes the imaging object 702 and the supporting object 703 existing in the virtual space 700 on corresponding positions in the image capturing the real space.

In S406, the arithmetic unit 101 determines whether the user instructed the operation unit 108 to end the image capturing mode. The image capturing support processing 400 ends if the end of the image capturing mode was instructed (S406: Yes). If the end of the image capturing mode was not instructed (S406: No), processing returns to S402, and the processing steps from S402 to S406 are repeated.

The processing steps from S402 to S406 are processing steps which are executed for each frame of the moving image that is captured by the imaging unit 107. However, the processing steps from S402 to S406 may be executed for a plurality of frames (e.g. five frames) at a time, as long as the supporting object can be displayed in such a way that the image capturing by the user is supported.

Figure 8A:
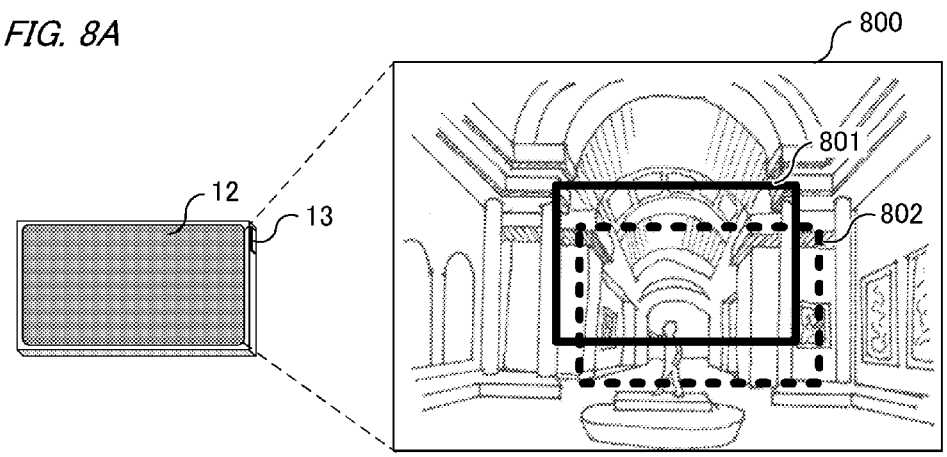
FIGS. 8A to 8C are display example of an imaging object and a supporting object on an LV screen.
Figure 8B:
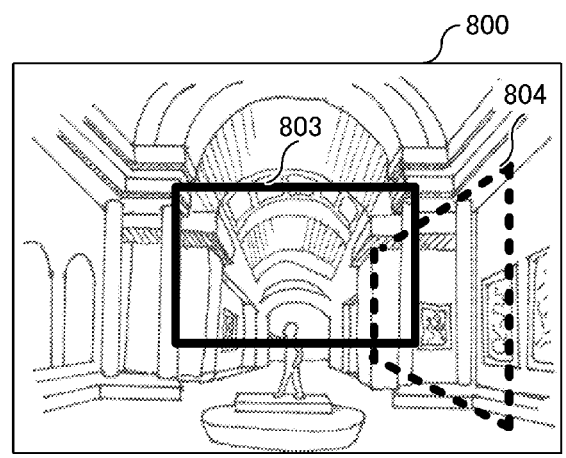
Figure 8C:
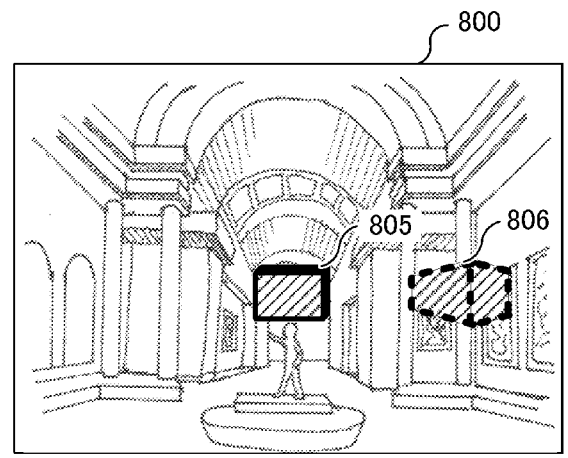

FIGS. 8A to 8C are display examples of an imaging object and a supporting object on the LV screen. FIGS. 8A to 8C indicate examples when an imaging object and a supporting object are superimposed on an image capturing the real space, and are displayed on an LV screen 800 (display unit 106).

FIG. 8A is an example when an imaging object 801 having a frame shape and a supporting object 802 having a frame shape exist on the LV screen 800 at the same depth and in the same orientation. The user can implement an appropriate image capturing angle of view or camera work by moving the imaging apparatus 1 such that the imaging object 801, which moves interlocking with the imaging apparatus 1, is overlayed on the supporting object 802.

FIG. 8B is an example when an imaging object 803 having a frame shape and a supporting object 804 having a frame shape exist on the LV screen 800 at different depths and in different orientations. The user can implement an appropriate image capturing angle of view or camera work by moving the imaging apparatus 1 such that the imaging object 803, which moves interlocking with the imaging apparatus 1, is overlaid on the supporting object 804.

FIG. 8C is an example when an imaging object 805 having a rectangular parallelepiped shape and a supporting object 806 having a rectangular parallelepiped shape exist on the LV screen 800 at different depths and in different orientations. The user can implement an appropriate image capturing angle of view or camera work by moving the imaging apparatus 1 such that the imaging object 805, which moves interlocking with the imaging apparatus 1, is overlaid on the supporting object 806.

In the above example, a case of supporting the image capturing by the user using the imaging apparatus 1 was described, but the present embodiment may be implemented by an HMD2 having a similar configurations as the configuration of the imaging apparatus 1 indicated in FIG. 3.

The supporting object may be constantly displayed while an image is captured in the imaging mode, or may be displayed when a predetermined condition is satisfied. The predetermined condition is, for example, a case where either the difference in positions or the difference in orientations of the imaging object and the supporting object is a threshold value or more. The predetermined condition may also be a case where the moving speed of the imaging apparatus 1 is not constant, or a case where the path of the movement of the imaging apparatus 1 is irregular.

When a predetermined condition is satisfied, the display unit 106 may notify the user that the imaging apparatus 1 is not moving in accordance with the path information by temporarily displaying the supporting object. In the case where a predetermined condition is satisfied and the imaging apparatus 1 is moving in accordance with the path information, the display unit 106 may stop display of the supporting object.

The imaging object and the supporting object are generated by the image processing unit 102 of the imaging apparatus 1, but a cloud-based external device may perform this generation processing. In this case, the imaging apparatus 1 includes a communication unit that can communicate via a cloud, and send the information used for generating the imaging object and the supporting object. The information to be sent via cloud is a captured image by the imaging apparatus 1, path information to indicate the movement of the imaging apparatus 1, and virtual space information, for example.

The imaging apparatus 1 may receive (acquire) the imaging object and the supporting object generated via a cloud, and display the objects on the LV screen superimposed on an image capturing a real space. By having an external device generate the AR content, such as the imaging object and the supporting object, the imaging apparatus 1 need not include a high performance large scale SoC, which makes it possible to downsize the imaging apparatus 1.

According to the above mentioned imaging apparatus 1 or the HMD2, the user can easily determine an appropriate angle of view or implement appropriate camera work, by moving the imaging apparatus 1 or the HMD2 such that the imaging object displayed on the LV screen is overlaid on the supporting object.

Embodiment 2

In Embodiment 1, the image processing unit 102 generates the supporting object based on the path information and current image capturing range, independently from the movement of the imaging object. In Embodiment 2, on the other hand, the supporting object is generated reflecting the movement of the imaging object in real-time. Therefore the imaging apparatus 1 can generate an optimum supporting object considering the movement of the user.

The hardware configuration of the imaging apparatus 1 according to Embodiment 2 is the same as the hardware configuration of the imaging apparatus 1 according to Embodiment 1 indicated in FIG. 3, hence description thereof is omitted. Just like Embodiment 1, Embodiment 2 may be implemented by an HMD2 which has a similar configuration as the configuration of the imaging apparatus 1 indicated in FIG. 3.

FIG. 9 is a flow chart exemplifying an image capturing support processing 900 according to Embodiment 2. The image capturing support processing 900 is a processing to generate a supporting object based on the movement of an imaging object.

In each processing step of the image capturing support processing 900, a same processing step as the image capturing support processing 400 of Embodiment 1 indicated in FIG. 4 is denoted with a same reference sign, and detailed description thereof is omitted. Processing steps S901, S902 and S903, which are different from the image capturing support processing 400 of Embodiment 1, will be described.

The image capturing support processing 900 is started, for example, when the user operates the operation unit 108 of the imaging apparatus 1, and the imaging apparatus 1 enters the image capturing mode. The arithmetic unit 101 of the imaging apparatus 1 executes a program for each composing element to perform each processing step of the image capturing support processing 400.

In S402, the three-dimensional space recognizing unit 109 acquires the virtual space information just like Embodiment 1. In S403, the image processing unit 102 generates an imaging object which indicates an image capturing range where the imaging unit 107 is capturing an image in the virtual space.

In S901, it is determined whether this is the first loop of the image capturing support processing. In Embodiment 2, the image processing unit 102 generates a supporting object based on the movement of a plurality of imaging objects. In the first loop, only one imaging object is generated, hence the image processing unit 102 generates more imaging objects.

If this is the first loop (S901: Yes), processing returns to S402. By repeating the processing steps S402 and S403, the image processing unit 102 can generate a plurality of imaging objects having a time difference. If this is the second or later loop (S901: No), processing advances to S902.

In S902, the image processing unit 102 generates a supporting object, which is an AR object to support image capturing, from two imaging objects generated for the current frame and previous frame. The information on the generated supporting object is added to the virtual space information that is held in the primary storage unit 104.

Figure 10:
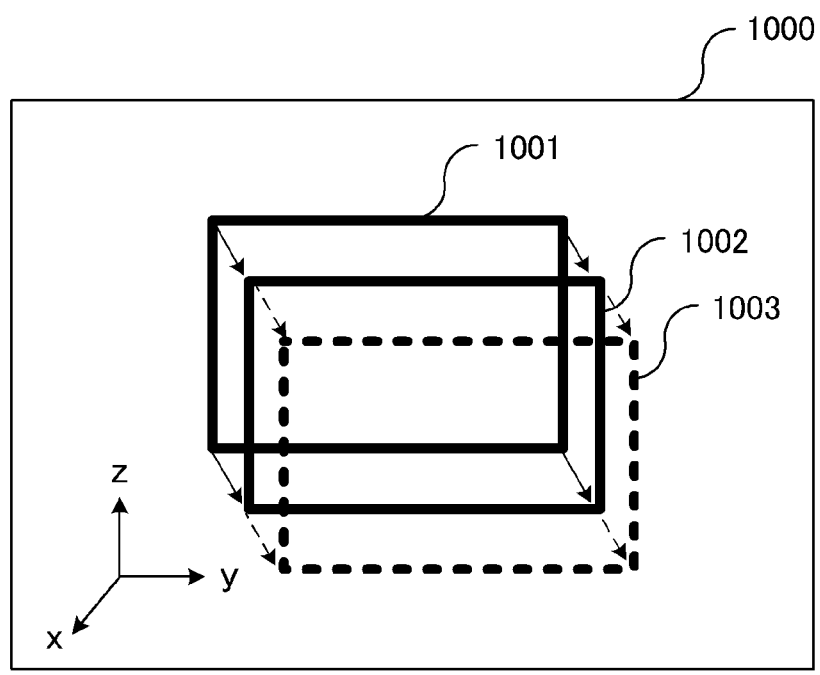
FIG. 10 is an example of generating an imaging object and a supporting object according to Embodiment 2.

FIG. 10 is an example of generating an imaging object and a supporting object. FIG. 10 is a schematic diagram depicting a state where information on an imaging object 1001 of the previous frame, an imaging object 1002 of the current frame, and a supporting object 1003 is added to the information on the virtual space 1000. The previous frame is not limited to the frame immediately before the current frame, but may be a frame that precedes the current frame by a plurality of frames.

Specifically, the supporting object can be generated by the following method. The image processing unit 102 acquires the change amounts of the position, orientation, moving speed, and the like when the imaging object 1001 in the previous frame moved to the imaging object 1002 in the current frame in the virtual space 1000. The change amounts are the moving amount, rotation amount, acceleration and the like from the imaging object 1001 to the imaging object 1002.

Based on the acquired change amounts, the image processing unit 102 estimates the position and orientation of the imaging object in the next frame by the position and orientation of the supporting object 1003. The image processing unit 102 adds the information on the estimated supporting object 1003 to the information on the virtual space 1000.

Based on the position and orientation of the imaging object 1001 in the past, and the position and orientation of the current imaging object 1002, the image processing unit 102 can determine the predetermined position and the predetermined orientation of the imaging apparatus 1, and generate the supporting object.

In S903, the display unit 106 superimposes the imaging object of the current frame and the estimated supporting object on the image capturing the real space, and displays the objects on the LV screen. The superimposing processing may be performed by the image processing unit 102. The processing in S406 is the same as the processing of Embodiment 1 indicated in FIG. 4.

The image processing unit 102 can generate an imaging object in the virtual space corresponding to the image capturing range in the case where the imaging apparatus 1 has the position and orientation in the past. The display unit 106 may display the imaging object in the past on the LV screen along with the supporting object and the current imaging object. The imaging object in the past corresponds to the "third object".

In the example described above, the imaging apparatus 1 supports the image capturing by the user, but the present embodiment may be implemented by an HMD2 having a configuration similar to the configuration of the imaging apparatus 1 indicated in FIG. 3.

While capturing the image in the imaging mode, the supporting object may be displayed constantly so as to move in real-time, or may be displayed only when a predetermined condition is satisfied. The predetermined condition is, for example, a case where the moving speed of the imaging apparatus 1 is not constant, or a case where the path of the movement of the imaging apparatus 1 is irregular. The display unit 106 can notify the user that the imaging apparatus 1 is not moving at a constant speed, for example, by temporarily displaying the supporting object when the predetermined condition is satisfied.

The imaging object and the supporting object are generated by the image processing unit 102 of the imaging apparatus 1, but may also be generated via a cloud. The imaging apparatus 1 may receive (acquire) the imaging object and the supporting object generated via a cloud and superimpose and display the objects on the LV screen.

In the example described above, the supporting object is generated based on the change amount of the imaging object, but may be generated based on the change amount of the position, orientation, moving speed and the like of the imaging apparatus 1 when images in the previous frame and current frame are captured. Based on the changes between the previous position and orientation of the imaging apparatus 1 in the past, and the current position and orientation of the imaging apparatus 1, the image processing unit 102 can determine the predetermined position and the predetermined orientation of the imaging apparatus 1, and generate the supporting object.

The above mentioned imaging apparatus 1 or HMD2 can generate a supporting object to determine an appropriate angle of view considering the movement of the user. By moving the imaging apparatus 1 or the HMD2 so that the imaging object is overlaid on the supporting object, the user can move the imaging apparatus 1 at a constant speed or rotate the imaging apparatus 1 at a constant angular velocity in accordance with the movement of the user.

Embodiment 3

Embodiment 1 and Embodiment 2 are embodiments to support image capturing by the user using either the imaging apparatus 1 or the HMD2. Embodiment 3, on the other hand, is an embodiment where the imaging apparatus 1 and the HMD2 are operated in tandem. In Embodiment 3, the imaging apparatus 1, which specializes in imaging functions, and the HMD2, which can display AR objects in a wide range, can be used utilizing their respective advantages.

Figure 11:
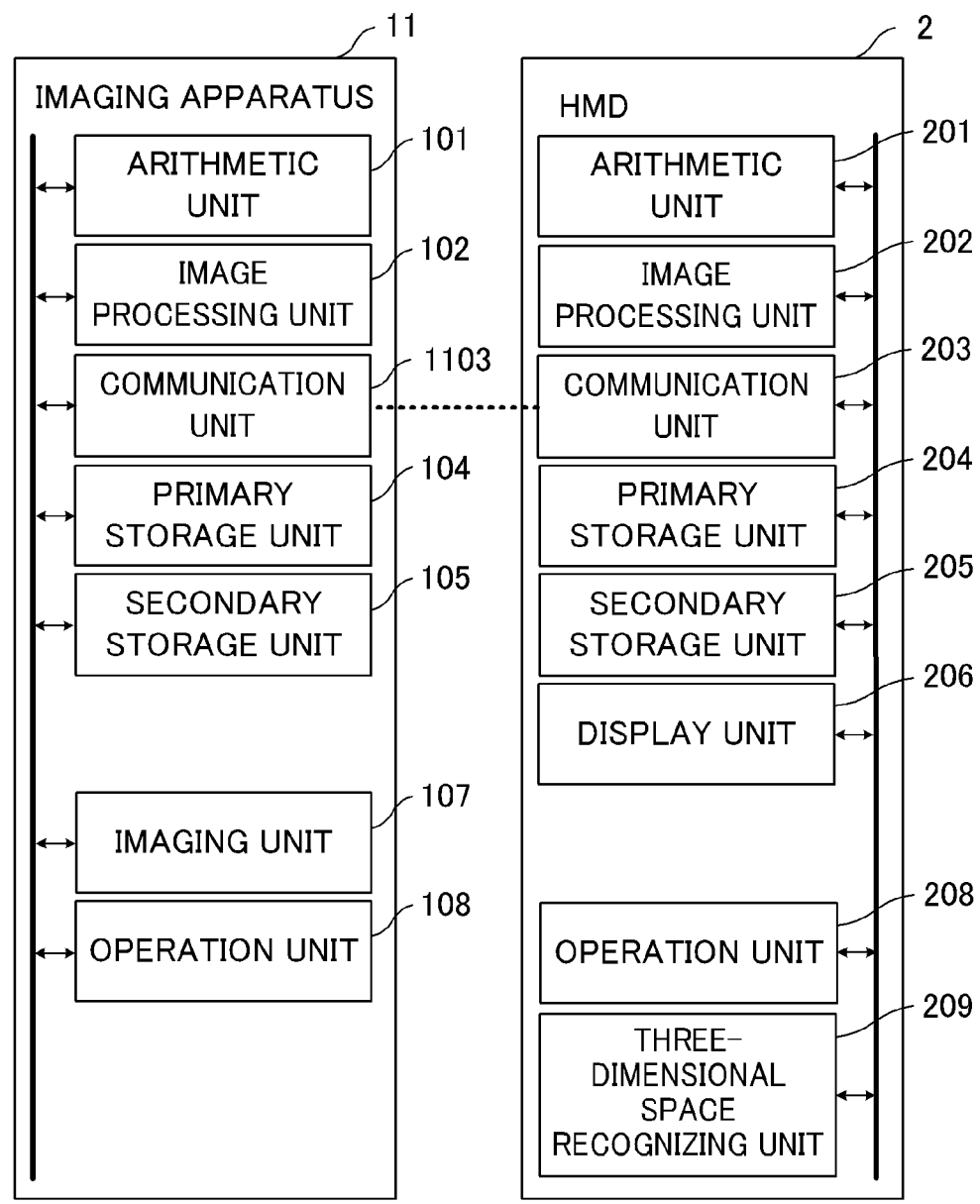
FIG. 11 is a diagram depicting hardware configuration examples of an imaging apparatus and an HMD of Embodiment 3.

FIG. 11 is a diagram depicting hardware configuration examples of an imaging apparatus 11 and an HMD2 according to Embodiment 3. The imaging apparatus 11 according to Embodiment 3 includes an arithmetic unit 101, an image processing unit 102, a primary storage unit 104, a secondary storage unit 105, an imaging unit 107, and an operation unit 108, just like the imaging apparatus 1 according to Embodiment 1. The imaging apparatus 11 further includes a communication unit 1103. Each composing element of the imaging apparatus 11 is interconnected via bus. A composing element the same as the imaging apparatus 1 is denoted with a same reference sign, and description thereof is omitted.

The HMD2 according to Embodiment 3 includes an arithmetic unit 201, an image processing unit 202, a primary storage unit 204, a secondary storage unit 205, a display unit 206, an operation unit 208 and a three-dimensional space recognizing unit 209, just like the imaging apparatus 1 according to Embodiment 1. The arithmetic unit 201 may include a hardware circuit to implement the functions executed by the HMD2. The HMD2 further includes a communication unit 203. Each composing element of the HMD2 is interconnected via a bus. A composing element having a same name as the imaging apparatus 1 functions in a same manner as the corresponding composing element of the imaging apparatus 1, and detailed description thereof is omitted. The display unit 206 corresponds to the display unit 21a and the display unit 21b of the HMD2. The display unit 206 is an example of the "display control unit".

The imaging apparatus 11 and the HMD2 communicate with each other via the communication unit 1103 and the communication unit 203. The imaging apparatus 11 sends the image captured by the imaging unit 107 to the HMD2 via the communication unit 1103 and the communication unit 203.

FIG. 12A and FIG. 12B are flow charts exemplifying the image capturing support processing according to Embodiment 3. The image capturing support processing according to Embodiment 3 is a processing using the imaging apparatus 11 and the HMD2 in tandem. The image capturing support processing according to Embodiment 3 includes image capturing processing 1200a in FIG. 12A performed by the imaging apparatus 11, and image capturing support processing 1200b in FIG. 12B performed by the HMD2.

The image capturing processing 1200a performed by the imaging apparatus 11 is started when the user operates the operation unit 108 to set the image capturing mode. The image capturing support processing 1200b performed by the HMD2 is started when the user operates the operation unit 208 to set the image capturing mode. The image capturing support processing 1200b may also be started when the imaging apparatus 11 is set to the image capturing mode, or when the captured image is received from the imaging apparatus 11.

The arithmetic unit 101 of the imaging apparatus 11 and the arithmetic unit 201 of the HMD2 execute programs for each composing element to perform each processing step of the image capturing processing 1200a and the image capturing support processing 1200b respectively.

In S1201b, the three-dimensional space recognizing unit 209 of the HMD2 acquires the position of the object and distance to the object in the real space as the virtual space information, and holds the information in the primary storage unit 204. The three-dimensional space recognizing unit 209 is an example of the "acquiring unit". The virtual space information may be acquired in S1202b after receiving the captured image from the imaging apparatus 1.

In S1202a, the communication unit 103 of the imaging apparatus 1 sends the image captured by the imaging unit 107 to the HMD2 via the communication unit 203. In S1202b, the communication unit 203 of the HMD2 determines whether the captured image was received from the communication unit 103 of the imaging apparatus 1.

If the captured image was received (S1202b: Yes), processing advances to S1203b. If the captured image was not received (S1202b: No), the processing step in S1203b is repeated until the captured image is received.

In S1203b, using the captured image received from the imaging apparatus 1, the image processing unit 202 generates an imaging object, which indicates an image capturing range where the imaging unit 107 is capturing an image in the virtual space. The image processing unit 202 adds the information on the generated imaging object to the virtual space information that is held in the primary storage unit 204. The image processing unit 202 is an example of the "generating unit".

In S1204b, the image processing unit 202 generates a supporting object in the same manner as S403 of the image capturing support processing 400 according to Embodiment 1, or S902 of the image capturing support processing 900 according to Embodiment 2. The image processing unit 202 adds the information on the generated supporting object to the virtual space information that is held in the primary storage unit 104.

In S1205b, the display unit 206 of the HMD2 displays the imaging object and the supporting object superimposed on the image capturing the real space.

In S1206b, the arithmetic unit 201 determines whether the user instructed the operation unit 208 to end the image capturing mode. If the end of the image capturing mode is instructed (S1206b: Yes), the image capturing support processing 1200b ends. If the end of the image capturing mode is not instructed (S1206b: No), processing returns to S1201b, and the image capturing support processing 1200b is repeated.

In S1206a, just like S1206b, the arithmetic unit 101 determines whether the user instructed the operation unit 108 to end the image capturing mode. If the end of the image capturing mode is instructed (S1206a: Yes), the image capturing processing 1200a ends. If the end of the image capturing mode is not instructed (S1206a: No), processing returns to S1202a, and the image capturing processing 1200a is repeated.

The image capturing support processing 1200b may end when the notification about the end of the image capturing processing 1200a is received from the imaging apparatus 11, without determining the end in S1206b. Further, the image capturing support processing 1200b may end when a captured image is not received from the imaging apparatus 11 for a predetermined time.

In S1203b of the image capturing support processing 1200b, the image processing unit 202 receives the captured image from the imaging apparatus 1, and acquires the position and orientation of the imaging object from the received captured image, but the present invention is not limited to this. The image processing unit 202 may acquire the position and orientation of the imaging object by acquiring the position and orientation of the imaging apparatus 11 from the image captured by the imaging unit of the HMD2.

The imaging object and the supporting object are generated by the image processing unit 202 of the HMD2, but may be generated via a cloud. In this case, the HMD2 communicates via the cloud and receives the imaging object and the supporting object generated on the cloud, then displays the object superimposed on the display unit 206 of the HMD2. Whether the imaging apparatus 11 and the HMD2 are operated in tandem or not may be set in advance, or may be set when the user switches the mode of the imaging apparatus 11 to the imaging mode.

According to the imaging apparatus 11 and the HMD2 described above, the user can support image capturing by utilizing the respective advantages of the imaging apparatus 11 which specializes in imaging functions, and the HMD2 which can display the AR objects in a wide range.

Other Embodiments

The imaging object is not limited to an AR object that indicates the range where an image is actually being captured. The image object may also be part of the image capturing range, instead of the entire image capturing range. In this case, the supporting object may be a part of the ideal image capturing range at the moving destination. The range of the supporting object may be determined such that ideal camera work can be implemented by the user, overlaying the imaging object on the supporting object. If the imaging object is a part of the image capturing range, the user can follow the imaging object to the supporting object more accurately than the case of overlaying the entire image capturing range on the supporting object.

A number of supporting objects is not limited to one, but may be two or more. For example, the image processing unit 102 (image processing unit 202) may generate a second supporting object based on the change amount of at least one of the position, orientation and moving speed between the imaging object and the generated first supporting object. In the same manner, the image processing unit 102 (image processing unit 202) may generate three or more supporting objects. If a plurality of supporting objects are displayed, the user can more easily estimate the moving destination of the imaging apparatus.

The predetermined position and the predetermined orientation of the imaging apparatus 1, to generate the supporting object, may be provided from an outside source. For example, the position and orientation of the imaging apparatus 1, when an image was captured in the past (e.g. several days or more in the past) using the imaging apparatus 1, may be provided as the predetermined position and predetermined orientation to generate the supporting object. Thereby the image capturing range of the captured image in the past can be superimposed and displayed as the supporting object, and the user can capture an image at the same position and in the same orientation as the image captured in the past.

Each embodiment described above merely exemplifies a configuration of the present invention. The present invention is not limited to the specific embodiments described above, and these embodiments may be combined or modified in various ways within the scope of the technical spirit of the invention.

According to the present disclosure, an appropriate angle of view can be easily determined, and image capturing in the three-dimensional space can be supported.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-103950, filed on Jun. 23, 2021, which is hereby incorporated by reference herein in its entirety.

What is claimed is:

1. An electronic device for supporting image capturing by an imaging apparatus, the electronic device comprising at least one processor and/or at least one circuit which function as:
    a generating unit configured to generate, in a virtual space, a first object indicating a current image capturing range of the imaging apparatus, and a second object presenting, as a moving destination of the first object, an image capturing range in a case where the imaging apparatus has a predetermined position and a predetermined orientation; and
    a display control unit configured to display the first object and the second object,
    wherein, when the generating unit determines that a user of the image capturing apparatus has caused the first object to overlay with the second object, the generating unit generates the second object corresponding to an image capturing range in a case where the imaging apparatus has a newly determined predetermined position and a newly determined predetermined orientation.

2. The electronic device according to claim 1, wherein the display control unit displays the first object and the second object in a state of superimposing the first object and the second object on an image in which a real space is captured.

3. The electronic device according to claim 1, wherein the generating unit determines the predetermined position and the predetermined orientation, based on path information which indicates a future movement of the imaging apparatus.

4. The electronic device according to claim 3, wherein the path information is inputted by a user.

5. The electronic device according to claim 3, wherein the path information includes at least any of: a movement to move the imaging apparatus straight at a constant speed; a movement to rotate the imaging apparatus in a horizontal direction around the imaging apparatus or a user; a movement to rotate the imaging apparatus at a constant speed around an imaging axis of the imaging apparatus; and a movement to rotate the imaging apparatus around a subject.

6. The electronic device according to claim 3, wherein based on the path information, the generating unit generates a plurality of the second objects by regarding a position and an orientation of the imaging apparatus at each of a plurality of timings in the future as the predetermined position and the predetermined orientation.

7. The electronic device according to claim 1, wherein the generating unit determines the predetermined position and the predetermined orientation, based on changes between the position and orientation of the imaging apparatus in the past and the current position and orientation of the imaging apparatus, and generates the second object.

8. The electronic device according to claim 7, wherein the generating unit further generates a third object in a virtual space corresponding to an image capturing range in the case where the imaging apparatus has the position and the orientation in the past, and the display control unit further displays the third object.

9. The electronic device according to claim 1, wherein the at least one processor and/or the at least one circuit further function as an acquiring unit configured to acquire information on a virtual space by recognizing a position of an object and a distance to the object in a real space.

10. The electronic device according to claim 1, wherein the generating unit generates the first object such that the position of the first object becomes any of: a position at a focal distance of the imaging apparatus; a position at a predetermined distance from the imaging apparatus; and a position where a size of the first object becomes a predetermined size.

11. The electronic device according to claim 1, wherein the generating unit generates the second object such that a relative relationship of the predetermined position and the position of the second object becomes the same as a relative relationship of the current position of the imaging apparatus and the position of the first object.

12. The electronic device according to claim 1, wherein the display control unit displays the second object in a case where a difference of the positions or a difference of the orientations between the first object and the second object is a threshold or more.

13. The electronic device according to claim 1, wherein the display control unit displays the second object in a case where a moving speed of the electronic device is not constant, or a case where a path of the movement of the electronic device is irregular.

14. The electronic device according to claim 1, wherein the imaging apparatus is integrated into the electronic device.

15. The electronic device according to claim 1, wherein the imaging apparatus is separated from the electronic device.

16. The electronic device according to claim 1, wherein the electronic device is a head mounted type display device.

17. The electronic device according to claim 1, wherein the generating unit requests an external device to perform processing to generate the first object and the second object, and acquires the first object and the second object generated by the external device.

18. A method for controlling an electronic device for supporting image capturing by the imaging apparatus, the method comprising:
    a generation step of generating, in a virtual space, a first object indicating a current image capturing range of the imaging apparatus, and a second object presenting, as a moving destination of the first object, an image capturing range in a case where the imaging apparatus has a predetermined position and a predetermined orientation; and a display control step of displaying the first object and the second object, wherein, when it is determined that a user of the imaging apparatus has caused the first object to overlay with the second object, the second object, which corresponds to an image capturing range in a case where the imaging apparatus has a newly determined predetermined position and a newly determined predetermined orientation, is generated.

19. A non-transitory computer-readable medium that stores a program, wherein the program causes a computer to execute a control method of an electronic device for supporting image capturing by the imaging apparatus, the control method comprising:

a generation step of generating, in a virtual space, a first object indicating a current image capturing range of the imaging apparatus, and a second object presenting, as a moving destination of the first object, an image capturing range in a case where the imaging apparatus has a predetermined position and a predetermined orientation; and a display control step of displaying the first object and the second object wherein, when it is determined that a user of the imaging apparatus has caused the first object to overlay with the second object, the second object, which corresponds to an image capturing range in a case where the imaging apparatus has a newly determined predetermined position and a newly determined predetermined orientation, is generated.

\* \* \* \* \*